United States Patent
Gueugneau

(10) Patent No.: US 9,463,604 B2
(45) Date of Patent: Oct. 11, 2016

(54) PART FOR A MOLD FOR A TIRE, COMPRISING AN INSERT

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventor: Anthony Gueugneau, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUES S.A., Granges-Paccot (CH)

( * ) Notice: Subject to any disclaimer, the term of this patent is extended or adjusted under 35 U.S.C. 154(b) by 0 days.

(21) Appl. No.: 14/436,662
(22) PCT Filed: Oct. 1, 2013
(86) PCT No.: PCT/EP2013/070393
§ 371 (c)(1),
(2) Date: Apr. 17, 2015
(87) PCT Pub. No.: WO2014/060208
PCT Pub. Date: Apr. 24, 2014

(65) Prior Publication Data
US 2015/0258745 A1 Sep. 17, 2015

(30) Foreign Application Priority Data
Oct. 17, 2012 (FR) ...................... 12 59901

(51) Int. Cl.
*B29D 30/06* (2006.01)
*B29C 33/10* (2006.01)
*B33Y 80/00* (2015.01)

(52) U.S. Cl.
CPC .......... *B29D 30/0606* (2013.01); *B29C 33/10* (2013.01); *B29D 2030/0614* (2013.01); *B29D 2030/0617* (2013.01); *B33Y 80/00* (2014.12)

(58) Field of Classification Search
CPC .............. B29C 33/10; B29D 30/0606; B29D 2030/0617
See application file for complete search history.

(56) References Cited

U.S. PATENT DOCUMENTS 3,804,566 A * 4/1974 Kimura .................. B29C 33/10
249/141
5,431,873 A 7/1995 Vandenberghe
(Continued)

FOREIGN PATENT DOCUMENTS

| AT | 387539 B | 2/1989 |
|---|---|---|
| DE | 19628166 | 1/1998 |

(Continued)

OTHER PUBLICATIONS

International Search Report for PCT/EP2013/070393 dated Dec. 20, 2013.

*Primary Examiner* — James Mackey
(74) *Attorney, Agent, or Firm* — Dickinson Wright PLLC

(57) ABSTRACT

A tire mold part having a body with a first surface intended to mold all or part of a tread surface, a second surface opposite the first and intended to contact another part of the mold, and a lateral face connecting the first surface and the second surface. The body includes a sintered part of a metallic powder fused together layer by layer, and a non-sintered part attached to the sintered part and in contact therewith in a contact zone, the sintered part forming the first surface and the non-sintered part forming the second surface. The sintered part has a thickness (E) of between 1 and 6 millimeters. The mold part further includes a cavity extending from the first surface into the part beyond the contact zone, without opening onto the second surface. The part comprises an insert placed in the cavity, at the same level as the first surface, and including a canal extending from the first surface and opening onto the contact zone the contact zone opening onto the lateral face.

4 Claims, 3 Drawing Sheets

(56) References Cited

U.S. PATENT DOCUMENTS

| | | | | |
|---|---|---|---|---|
| 7,290,996 | B2 * | 11/2007 | Tanaka | B29D 30/0629 425/28.1 |
| 2002/0119209 | A1 | 8/2002 | Tanaka | |
| 2006/0188593 | A1 | 8/2006 | Tanaka | |
| 2011/0318532 | A1 | 12/2011 | Dusseaux et al. | |

FOREIGN PATENT DOCUMENTS

| | | |
|---|---|---|
| DE | 102004028462 | 12/2005 |
| DE | 102004052766 | 5/2006 |
| JP | 2009184194 | 8/2009 |
| KR | 100857970 | 9/2008 |
| WO | 2010076502 | 7/2010 |

* cited by examiner

PART FOR A MOLD FOR A TIRE, COMPRISING AN INSERT

This application is a 371 national phase entry of PCT/EP2013/070393 filed on 1 Oct. 2013, which claims benefit of French Patent Application No. 1259901, filed 17 Oct. 2012, the entire contents of which are incorporated herein by reference for all purposes.

BACKGROUND

1. Field

The present disclosure relates to a part intended to be arranged in a mold for a tire, notably a mold of the segmented type, this part comprising venting means. More particularly, the part comprises an insert attached in a cavity of this part, this insert allowing air to be discharged from the mold when the mold is closed.

2. Description of Related Art

A segmented mold comprises several separate parts which, when brought relatively closer together, delimit a molding space of toroidal overall shape. In particular, a segmented mold comprises two lateral shells for molding the sidewalls of the tire and several peripheral segments situated between the shells for molding the tread of the tire. All of these parts are brought closer together with suitable dynamics thanks to a determined mechanism.

In order to mold the tread, the mold segments comprise molding elements. What is meant by a molding element is an element of the mold which comprises a molding surface that allows part of the tread of a tire to be molded.

It is possible to create a molding element using a selective fusion method more commonly referred to as sintering. This method uses a beam of energy to fuse a metallic powder. A "beam of energy" means electromagnetic radiation (for example a laser beam) or a beam of particles (for example an electron beam).

A sintering method using a laser, hereinafter referred to as a laser sintering method, is known from document EP1641580. In that document, a first layer of metallic powder is spread on a plate. All or some of the particles of this first layer of powder are then agglomerated by the beam of a laser according to the shape of the object that is to be obtained. Once this step has been performed, a second layer of powder is spread on the first layer of powder so that it in turn can be selectively fused using the laser. By repeating these operations of spreading the layer and fusing using a laser, a sintered object is built up layer by layer.

Document WO2010/076502 discloses a particular molding element obtained using this laser sintering technique. This molding element, referred to as a skin, is of small thickness and is intended to be placed in a mold. In order to avoid air being trapped between the mold and a green tire during an operation of vulcanizing this tire, it is necessary to provide venting means in the molding element.

Documents DE102004028462 and DE102004052766 disclose examples of venting means. More particularly, these documents disclose a mold part comprising a molding element obtained by laser sintering and an interface element interfacing with the rest of the mold. This interface element is not sintered and is secured to the molding element. The molding element throughout its volume comprises a plurality of pores forming small-sized cavities. These cavities are able to guide the air towards drillings formed in the interface element and opening to the rear of this interface element. However, the presence of a high number of pores in the molding element reduces the material density of this element and makes it more fragile to mechanical loading. Thus, the venting solutions disclosed in documents DE102004028462 and DE102004052766, if applied to the molding element of document WO2010/076502 would make the latter element too fragile because of its small thickness. Furthermore, in documents DE102004028462 and DE102004052766, it is necessary to pierce the interface element through its entire thickness in order to allow the air to be discharged from the mold. This can weaken the interface element and therefore ultimately weaken the mold part in its entirety.

Document DE19628166 discloses another venting solution in which provision is made for an insert to be attached in a cavity produced beforehand within the depth of the molding element. The insert comprises a hollow cylindrical body and a plate like head formed as an integral part of this body. The head comprises a plurality of holes opening into the hollow part of the cylindrical body. The body of the insert has a length of at least 10 mm, so that it is fairly easy to handle in order to position it in the mold. With a molding element of small thickness like the one described in document WO2010/076502, it may be necessary to provide smaller inserts in the mold part. This then makes them more difficult to handle when placing them in the mold.

It is therefore an objective of embodiments of the invention to propose a venting solution using an insert in a mold that is able to address all or some of the disadvantages described hereinabove and which is simple and economical to implement.

DEFINITIONS

A "tire" means all types of resilient tread whether or not it is subjected to an internal pressure.

A "tread" of a tire means a quantity of rubbery material delimited by lateral surfaces and by two main surfaces one of which is intended to come into contact with a roadway when the tire is running.

A "cut" in a tread means the space delimited by walls of material that face one another and are distant from one another by a non-zero distance.

A "mold" means a collection of separate parts which, when brought relatively closer together, are able to delimit a toroidal molding space.

The "equivalent diameter" of a hole means the diameter of the circle inscribed inside the cross section of this hole.

A "pattern" on the tire means a decoration on this tire capable of improving its overall appearance and/or of providing technical or legal information regarding this tire.

SUMMARY

The invention, in an embodiment, relates to a tire mold part comprising a body, this body comprising a first surface intended to mold all or part of a tread surface of the tire, a second surface opposite the first surface and intended to be in contact with another part of the mold, and a lateral face connecting the first surface and the second surface. The body comprises a sintered part made of a metallic powder fused together layer by layer, and a non-sintered part attached to the sintered part and in contact with this sintered part at a contact zone. The sintered part forms the first surface of the body and has a thickness of between 1 and 6 millimeters. The non-sintered part forms the second surface of the body. The mold part comprises a cavity extending from the first surface into the depth of the part beyond the contact zone, this cavity not opening onto the second surface of the body. The part comprises an insert placed in the cavity, this insert being at the same level as the first surface of the body, and this insert comprises a canal extending from the first surface of the body and opening onto the contact zone between the sintered part and the non-sintered part of the body. The contact zone opens onto the lateral face of the body.

The invention, in an embodiment, proposes providing in the mold part a cavity that is deep enough that inserts of a length of at least 10 mm can be used while at the same time ensuring that this cavity does not open onto the second surface of the body. The removal of air from the mold is then performed by a canal extending from the first surface of the body and opening at a zone of contact between the two parts of which this body is made. Use is thus made of the natural space there is between these two parts in order to discharge air from the mold, doing so in a simple and practical way.

In an alternative form of embodiment, the canal is formed by a plurality of holes opening onto the first surface of the body. These holes form a grid structure on the insert. These holes have an equivalent diameter of between 0.05 and 1 mm.

The dimensions of the holes in the insert and the arrangement of these holes make it possible to limit the penetration of rubber into the insert when the mold is closed. This then prevents protruding bits of vulcanized rubber from appearing on the tread surface of the tire and therefore improves the overall appearance of this tire.

In one preferred embodiment, the grid structure of holes forms a marking on the insert, this marking being intended to mold a pattern on the tire.

By organizing the grid of holes in such a way that it is able to create a predefined pattern on the tire, the overall appearance of the tire is improved.

In one alternative form of embodiment, the mold part comprises a plurality of protrusions projecting from the first surface and intended to mold cuts in the tread of the tire. At least two protrusions of the plurality of protrusions intersect on this first surface, and the canal opens onto the first surface at the intersection of the two protrusions.

The point at which the protrusions intersect on the first surface of the body is particularly critical because a large amount of air can build up at this point as the mold is closed over the green tire. By making the canal open onto the intersection of two protrusions, it becomes easier to discharge air from the mold and the appearance of surface defects on the tread once this tread has been vulcanized is limited.

Another subject of the invention is a tire mold insert, this insert being intended to be attached in a cavity formed in the mold, this insert having a cylindrical overall shape comprising a first face and a second face opposite the first face and a casing connecting the first face to the second face. The insert also comprises a canal opening onto the first face and this canal opens onto the casing of the insert at a distance of between 1 and 6 mm away from the first face. This canal does not open onto the second face.

In one alternative form of embodiment, the canal is formed by a plurality of holes opening onto the first face. These holes form a grid structure on the insert, and these holes have an equivalent diameter of between 0.05 and 1 mm.

In one preferred embodiment, the insert is obtained by laser sintering.

BRIEF DESCRIPTION OF THE DRAWINGS

Other features and advantages of embodiments of the invention will become apparent from the following description, given by way of nonlimiting example, with reference to the attached drawings in which.

DETAILED DESCRIPTION OF SPECIFIC EMBODIMENTS

In the description which follows, elements which are substantially identical or similar will be denoted by identical references.

Figure 1:
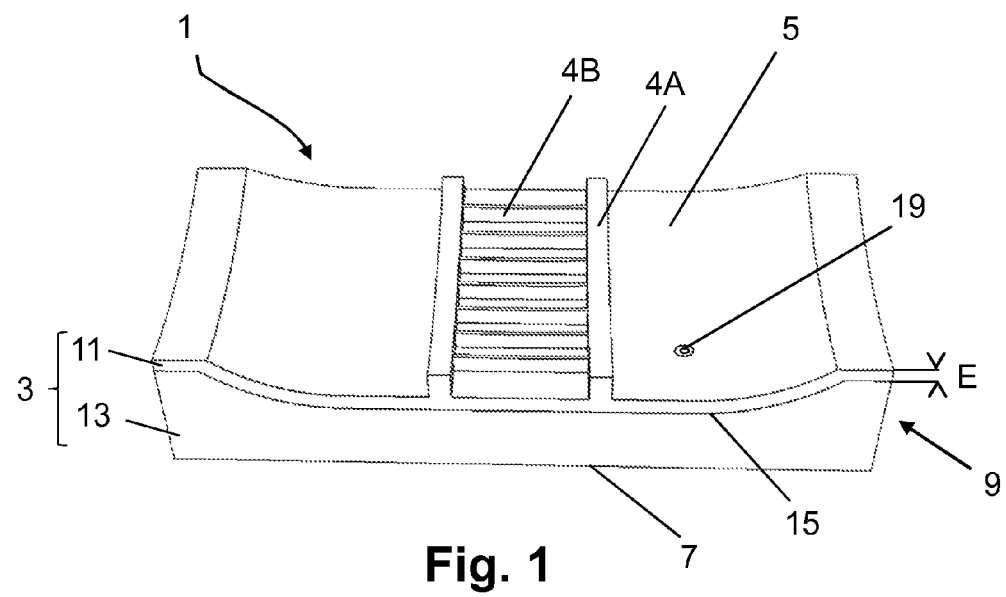
FIG. 1 is a perspective view of a molding element according to an embodiment of the invention.

FIG. 1 is a view in perspective of a mold part 1 according to an embodiment of the invention. More specifically, this part 1 comprises a body 3 comprising a sintered part 11 made from a metallic powder fused layer by layer, and a non-sintered part 13 which is, for example, made of steel. The sintered part 11 forms a first surface 5 intended to mold part of a tread surface of a tire, and the non-sintered part forms a second surface 7, opposite the first surface 5, intended to be in contact with another part of the mold (which other part is not depicted in FIG. 1). The sintered part 11 is attached to the non-sintered part 13 and between them they form a contact zone 15. This contact zone 15 defines, with the first surface 5, a thickness E of the sintered part 11. This thickness is between 1 and 6 millimeters. For preference, this thickness is between 2 and 2.5 millimeters. Thus the small thickness of the sintered part gives this part a lightness of weight and a flexibility that makes it easier to position and hold in position when attached to the non-sintered part. It will be noted that this sintered part 11 is held on the non-sintered part 13 by fixing means (not depicted in FIG. 1) such as screws or adhesive.

Figure 2:
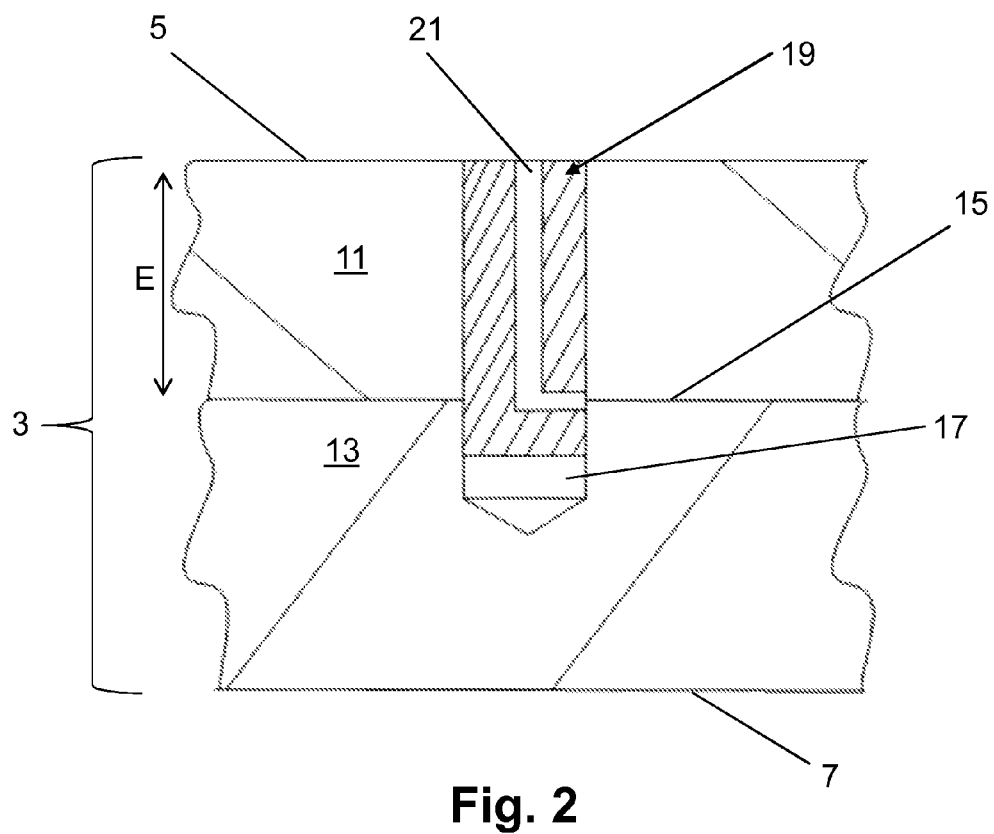
FIG. 2 is an enlargement of a view in cross section of the molding element of FIG. 1 in the region of the venting means according to a first embodiment.

The part 1 also comprises an insert 19 positioned in a cavity of this part. FIG. 2 shows this cavity 17 and this insert 19 in greater detail. Thus, the cavity 17 of the part 1 extends from the first surface 5 into the depth of the part 1 beyond the contact zone 15. This cavity 17 does not open onto the second surface 7 of the body 3. The insert 19 here is placed in the cavity 17 in such a way that it is at the same level of the first surface 5 of the body. More specifically, the insert comprises an air vent canal 21. This canal 21 extends from the first surface 5 of the body and opens in the region of the zone 15 of contact between the sintered part 11 and the non-sintered part 13. It will be noted that this contact zone opens onto a lateral face 9 of the body (visible in FIG. 1), this lateral face connecting the first surface 5 to the second surface 7. It will also be noted that the canal here forms a duct the diameter of which is, for example, of the order of 0.8 mm.

Figure 3:
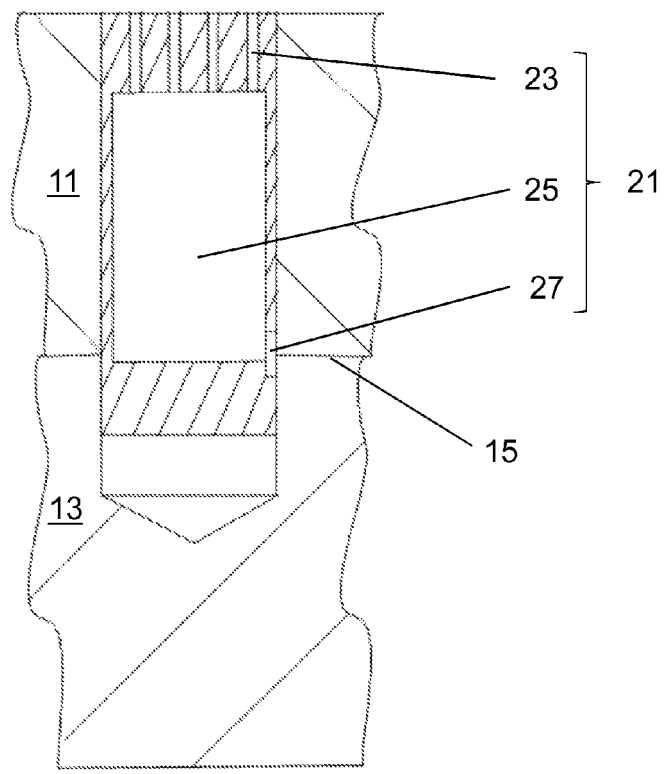
FIG. 3 is an enlargement of a view in cross section of the molding element of FIG. 1 in the region of venting means according to a second embodiment.

In a second embodiment visible in FIG. 3, the canal 21 of the insert 19 comprises a plurality of holes 23, a chamber 25 into which the holes open and a discharge orifice 27 open onto the zone 15 of contact between the sintered part 11 and the non-sintered part 13. The holes 23 of the insert 19 in this instance have a circular cross section of a diameter of between 0.05 and 1 mm. As an alternative, the cross section of the holes may be square, triangular or other.

It will be noted that the holes 23 of the insert 19 form a grid structure on this insert. This grid structure may form determined markings able to mold a particular pattern on the tire. This pattern may, for example, be a word, a logo or other.

Figure 4:
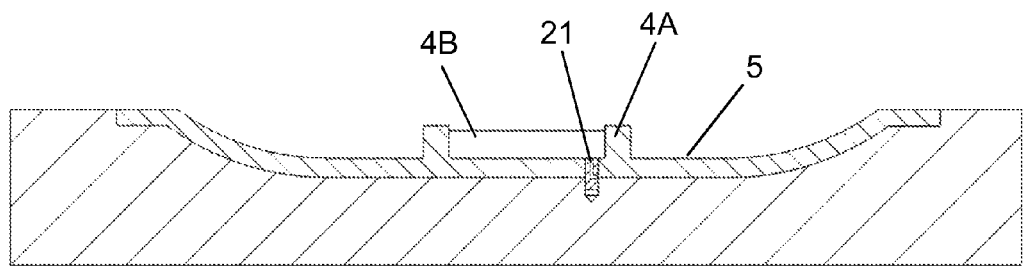
FIG. 4 schematically depicts a view in cross section of the pattern of FIG. 1 according to a third embodiment.

FIG. 4 shows a third embodiment in which the canal 21 opens onto the first surface 5 of the part 1 at the intersection of two protrusions 4A, 4B that project from this first surface.

Figure 5:
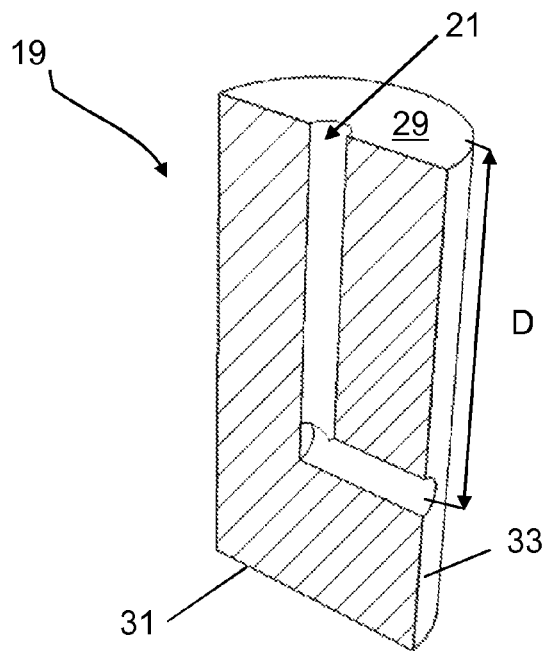
FIG. 5 schematically depicts a view in cross section of an insert according to the embodiment of FIG. 2.

FIG. 5 schematically depicts a view in cross section of an insert 19 according to the embodiment of FIG. 2. This insert 19 thus has a cylindrical overall shape comprising a first face 29, a second face 31 opposite the first face 29, and a casing 33 connecting the first face 29 to the second face 31. The insert also comprises a canal 21 opening onto the first face 29. This canal 21 also opens onto the casing 33 at a distance D of between 1 and 6 mm away from the first face 29. It will be noted here that the canal 21 does not open onto the second face 31.

Figure 6:
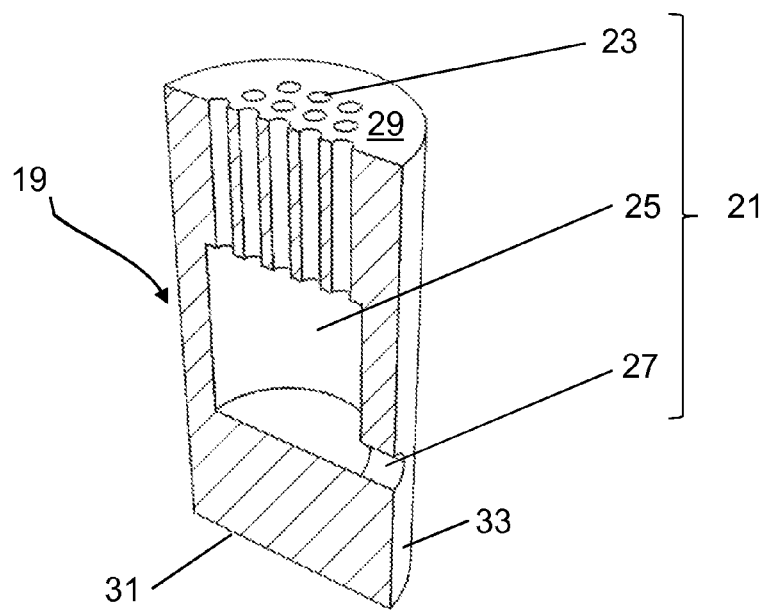
FIG. 6 schematically depicts a view in cross section of an insert according to the embodiment of FIG. 3.

FIG. 6 schematically depicts a view in cross section of an insert 19 according to the embodiment of FIG. 3. In this alternative form, the canal 21 comprises a plurality of holes 23, a chamber 25 into which the holes open and a discharge orifice 27. The holes 23 of the insert 19 here have a circular cross section of a diameter of between 0.05 and 1 mm. As an alternative, the cross section of the holes may be square, triangular or other.

It will be noted that the inserts of FIGS. 5 and 6 can be manufactured by laser sintering. As an alternative, these inserts may be manufactured by any other process, such as by a molding process.

The invention is not restricted to the embodiments described and depicted and various modifications can be made thereto without departing from its scope.

The invention claimed is:

1. A tire mold part comprising:
   a body, this body comprising:
      a first surface intended to mold all or part of a tread surface of the tire,
      a second surface opposite the first surface and intended to be in contact with another part of the mold, and
      a lateral face connecting the first surface and the second surface,
   wherein the body comprises:
      sintered part made of a metallic powder fused together layer by layer, and
      a non-sintered part attached to the sintered part and in contact with this sintered part at a contact zone,
      wherein the sintered part forms the first surface of the body and the non-sintered part forms the second surface of the body,
      wherein the sintered part has a thickness (E) of between 1 and 6 millimeters,
   a cavity extending from the first surface into a depth of the mold part beyond the contact zone,
      wherein this cavity does not open onto the second surface of the body,
   an insert placed in the cavity,
      wherein this insert is at the same level as the first surface of the body, and
      wherein the insert comprises a canal extending from the first surface of the body and opening onto the contact zone between the sintered part and the non-sintered part of the body, the contact zone opening onto the lateral face of the body.

2. The mold part according to claim 1, wherein the canal is formed by a plurality of holes opening onto the first surface of the body, these holes forming a grid structure on the insert, these holes having a diameter of between 0.05 and 1 mm.

3. The mold part according to claim 2, wherein the grid structure of holes forms a marking on the insert, this marking being intended to mold a pattern on the tire.

4. The mold part according to claim 1, further comprising a plurality of protrusions projecting from the first surface and intended to mold cuts in the tread of the tire, at least two protrusions of the plurality of protrusions intersecting on this first surface, and wherein the canal opens onto the first surface at the intersection of the two protrusions.

* * * * *